United States Patent
Nishida et al.

(12)

(10) Patent No.: US 6,818,256 B2
(45) Date of Patent: Nov. 16, 2004

(54) ENERGY CURABLE SEALANT COMPOSITION

(75) Inventors: Yuichi Nishida, Tokyo (JP); Takanori Sugiki, Tokyo (JP); Kazuhiko Yoshizumi, Tokyo (JP); Yoshio Kishimoto, Tokyo (JP)

(73) Assignee: Nichiban Company Limited, Tokyo (JP)

( * ) Notice: Subject to any disclaimer, the term of this patent is extended or adjusted under 35 U.S.C. 154(b) by 7 days.

(21) Appl. No.: 10/433,237

(22) PCT Filed: Dec. 3, 2001

(86) PCT No.: PCT/JP01/10529

§ 371 (c)(1),
(2), (4) Date: May 30, 2003

(87) PCT Pub. No.: WO02/44299

PCT Pub. Date: Jun. 6, 2002

(65) Prior Publication Data

US 2004/0034153 A1 Feb. 19, 2004

(30) Foreign Application Priority Data

Dec. 1, 2000 (JP) .......................................... 2000-08532

(51) Int. Cl.$^7$ .............................. B05D 3/02; B05D 3/06

(52) U.S. Cl. ..................................... 427/487; 427/385.5

(58) Field of Search .............................. 427/487, 385.5, 427/388.1

(56) References Cited

FOREIGN PATENT DOCUMENTS

| JP | 63-238102 | * | 10/1988 |
|---|---|---|---|
| JP | 01-020213 | * | 1/1989 |
| JP | 01-245008 | * | 9/1989 |
| JP | 5-65317 A | | 3/1993 |
| JP | 5-255035 A | | 10/1993 |
| JP | 6-116546 A | | 4/1994 |
| JP | 6-220421 A | | 8/1994 |
| JP | 7-228860 A | | 8/1995 |
| JP | 9-227858 A | | 9/1997 |
| JP | 9-291257 A | | 11/1997 |

* cited by examiner

Primary Examiner—Erma Cameron
(74) Attorney, Agent, or Firm—Frishauf, Holtz, Goodman & Chick, P.C.

(57) ABSTRACT

An energy-curable sealing material composition which is reduced in odor during the production, application, and curing thereof, and upon curing has satisfactory low-temperature flexibility. It comprises a phenyl-containing (meth)acrylate monomer having a molecular weight of 200 or higher and a photoreaction initiator.

21 Claims, No Drawings

ENERGY CURABLE SEALANT COMPOSITION

This application is a United States National Phase Application under 35 U.S.C. 371 of International Application No. PCT/JP01/10529 (not published in English) filed Dec. 3, 2001.

FIELD OF THE INVENTION

The present invention relates to an oil-coated surface adhesive energy curable sealant composition having satisfactory adhesion to oil-coated steel sheets.

More particularly, the present invention is concerned with a sealant composition curable with energy, such as light or heat, which is advantageous not only in that the composition generates less odor during production, application, and curing of the products, but also in that the composition cured is strongly bonded to various materials coated with oil and it has excellent low-temperature flexibility.

BACKGROUND ART

In the production process for body of automobile, a great amount of a sealant is currently used for prevention of rust or corrosion. A body of automobile is generally produced by a process in which a cold-rolled steel sheet, galvanized steel sheet, or aluminum alloy coated with press oil or anticorrosive oil is pressed and then subjected to degreasing step (cleaning of oil) and electrodeposition coating, and a sealant is applied to the electrodeposition-coated surface of the sheet and dried, followed by application of intermediate coat and top coat. If possible, a sealant may be applied to the sheet and dried prior to the degreasing step.

Further, in the production process for precoated metal (precoated steel sheet), cold-rolled steel sheets, galvanized steel sheets, or aluminum alloy coated with press oil or anticorrosive oil must be cleaned to remove the press oil or anticorrosive oil. In the cleaning step, cleaning water and chemicals (additives, e.g., a surfactant) are used and hence a drying step and a wastewater treatment step are needed.

Sealants used for preventing automobiles from suffering rust or corrosion include vinyl chloride ones and urethane ones, but most of the sealants are vinyl chloride ones, which comprise polyvinyl chloride impregnated with a plasticizer and a stabilizer.

The vinyl chloride sealer contains chlorine and therefore has a problem that it cannot be disposed of with ease by burning. On the other hand, the urethane sealer is of a two-part type or moisture-curing type and hence it has a drawback that mixing by means of a mixing machine is required before application or it takes a prolonged time to set the sealer. Further, these sealers have poor adhesion to cold-rolled steel sheets, galvanized steel sheets, or aluminum alloy coated with press oil or anticorrosive oil and therefore, they may be washed away in the oil cleaning step before the coating step.

As a method for solving the above problems, in Japanese Patent Application No. 223978/1999, the present inventors already have proposed a photocuring sealant composition having excellent adhesion to oil-coated surface, using an acrylate monomer having a solubility parameter (SP value) of 9 to 14, filler, such as hydrophobic silica, and a phosphoric acid ester monomer. Specific examples of acrylates that the present inventors have proposed as a main component include 2-hydroxy-3-phenoxypropyl acrylate, 2-acryloyloxyethyl-2-hydroxyethyl phthalate, and phenoxyethyl acryalte.

However, the cured product of the photocuring sealant composition using the above acrylate monomer has a problem that the cured product has poor low-temperature flexibility and the monomer produces odor or fumes. Strong odor or large amounts of fumes cause the environment for production and curing (UV radiation) of the products to be bad, making it difficult to use the composition. Especially in the curing (UV radiation), investment of exhaust equipment is needed. For solving the problems, in the present inventions (1) to (9), it is an object to provide a photocuring sealant composition which is advantageous not only in that the composition generates less odor during production, application, and curing of the products, but also in that the composition cured is strongly bonded to various materials coated with oil and it has excellent low-temperature flexibility.

The sealant composition which is crosslinked and cured solely by a photoreaction has no problem in common uses, but when a current flows through the sealant composition applied to various materials in the electrodeposition coating step, the composition cured encounters a problem in that small bubbles generate between the sealant and the base material (especially an aluminum sheet or steel sheet). Further, there also occurs a problem in that the sealant cured may have only an unsatisfactory hardness. For solving the problems, in the present inventions (10) and (11), it is an object to provide a photocuring or thermosetting sealant composition which is advantageous not only in that the composition generates less odor during production, application, and curing of the products, but also in that the composition cured is strongly bonded to various materials coated with oil and it has excellent low-temperature flexibility and does not generate bubbles in the electrodeposition coating step.

Furthermore, as a photocuring sealant composition having excellent adhesion to oil-coated surface and requiring no cleaning step for oil, there has been proposed the above-mentioned sealant composition which comprises (a)an (meth)acrylate monomer having a solubility parameter of 9 to 14, hydrophobic silica as filler, and a phosphoric acid ester monomer. This composition proposed contains hydrophobic silica as an essential component in the monomer component to improve the oil absorption and the viscosity as a property of the sealant, and the operability (causing neither stringness nor sag) as well as the hardness of the sealant cured. However, the adhesion to oil-coated surfaces is required not only in the field of sealant but also in the field of coating agent. Thus, in the present inventions (13) to (15), it is an object to provide a composition having a lower viscosity than the high viscosity of the composition for sealant.

DISCLOSURE OF THE INVENTION

The present inventors have made a number of studies with a view toward developing a sealant composition which exhibits excellent low-temperature flexibility of the cured product while maintaining excellent adhesion of the sealant composition to the surfaces of various steel sheets coated with oil and which produces reduced fumes or odor during production of the products and ultraviolet radiation. As a result, they have found that the problems can be solved by using a specific monomer, and thus completed the present invention. Further, it has also been found that, by incorporating a thermoplastic resin into the sealant composition, not only can the adhesion of the composition be further improved, but also fumes or odor produced during ultraviolet radiation for the composition can be reduced.

Specifically, the present invention (1) is an energy curable sealant composition which comprises: (a) (a)an (meth) acrylate monomer having a phenyl group and having a molecular weight of 200 or more; and (b) a photoreaction initiator.

The present invention (2) is the composition according to the invention (1) above, wherein component (a) is a compound represented by the following formula:

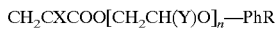

wherein each of X and Y independently represents H or $CH_3$; n represents an integer of 2 to 10; Ph represents a phenyl group; R represents $C_mH_{2m+1}$; and m represents an integer of 0 to 12.

The present invention (3) is the composition according to the invention (1) or (2) above, which further comprises: (a)' (a)an (meth)acrylic acid ester containing a phosphoric acid group or a salt thereof, and/or (a)an (meth)acrylic acid ester containing a sulfonic acid group or a salt thereof, and/or (a)an (meth)acrylic acid ester containing a carboxyl group or a salt thereof.

The present invention (4) is the composition according to any one of the inventions (1) to (3) above, wherein component (b) is an acetophenone or an acylphosphine oxide compound.

The present invention (5) is the composition according to any one of the inventions (1) to (4) above, which further comprises: (c) a thermoplastic resin.

The present invention (6) is the composition according to the invention (5) above, wherein component (c) is an ethylene-vinyl acetate copolymer, an ethylene-ethyl acrylate copolymer, a styrene-butadiene-styrene block copolymer, a styrene-ethylene-butylene-styrene block copolymer, a styrene-ethylene-propylene-styrene block copolymer, a styrene-1,4-butadiene-butylene-styrene block copolymer, or polystyrene.

The present invention (7) is the composition according to any one of the inventions (1) to (6) above, which further comprises: (d) filler.

The present invention (8) is the composition-according to the invention (7) above, wherein component (d) is silica or hydrophobic silica.

The present invention (9) is an energy curable sealant composition which comprises: 100 parts by weight of (a)an (meth)acrylate monomer having a phenyl group and having a molecular weight of 200 or more; 0 to 100 parts by weight of (a)an (meth)acrylic acid ester containing a phosphoric acid group or a salt thereof, and/or (a)an (meth)acrylic acid ester containing a sulfonic acid group or a salt thereof, and/or (a)an (meth)acrylic acid ester containing a carboxyl group or a salt thereof; 0 to 60 parts by weight of hydrophobic silica; 0 to 50 parts by weight of a thermoplastic resin; and 0.01 to 20 parts by weight of a photoreaction initiator.

Further, the present inventors have made extensive and intensive studies with a view toward developing a sealant composition which has excellent adhesion to various materials and excellent low-temperature flexibility of the cured product while maintaining excellent adhesion of the sealant composition to the surfaces of various steel sheets coated with oil, and which generates no bubbles when a current flows through the substrate in electrodeposition coating. As a result, they have found that the problems can be solved by incorporating a curable epoxy resin into the compositions of the inventions (1) to (9) above and using (a)an (meth) acrylate monomer having no phenyl group and having a glass transition temperature of –20° C. or lower as measured with respect to the homopolymer thereof.

Specifically, the present invention (10) is the composition according to any one of the inventions (1) to (8) above, which further comprises: (a)" (a)an (meth)acrylate monomer having no phenyl group and having a glass transition temperature of –20° C. or lower as measured with respect to the homopolymer thereof; (e) an epoxy resin; and (f) a latent curing agent.

The present invention (11) is the composition according to the invention (10) above, which contains 100 parts by weight of the sum of component (a) and component (a)" {or 100 parts by weight of the sum of component (a), component (a)", and component (c)}, and 20 to 200 parts by weight of the sum of component (e) and component (f).

The present invention (12) is the composition according to any one of the inventions (1) to (11) above, which has adhesion to oil-coated surface.

Further, the present inventors have found that, by using a copolymer containing polystyrene or styrene as a copolymer component, the resultant composition exhibits adhesion to oil-coated surface without using hydrophobic silica and has a lowered viscosity, and thus completed the present invention.

Specifically, the present invention (13) is an energy curable composition having adhesion to oil-coated surface, which comprises: (1) (a)an (meth)acrylate monomer having a phenyl group and having a solubility parameter of 9 to 14; (2) a polystyrene or a copolymer containing styrene as a copolymer component; and (3) a photoreaction initiator.

The present invention (14) is the composition according to the invention (13) above, wherein component (2) is selected from the group consisting of a styrene-butadiene-styrene block copolymer, a styrene-isoprene-styrene block copolymer, a styrene-ethylene-butylene-styrene block copolymer, a styrene-ethylene-propylene-styrene block copolymer, and a styrene-1,4-butadiene-butylene-styrene block copolymer.

The present invention (15) is the composition according to the invention (13) or (14) above, which further comprises: (4) (a)an (meth)acrylate monomer containing at least one group selected from the group consisting of a phosphoric acid group, a sulfonic acid group, a carboxyl group, and salts thereof.

BEST MODE FOR CARRYING OUT THE INVENTION

Hereinbelow, the components of the composition of the present invention will be described.

With respect to component (a), there is no particular limitation as long as it is (a)an (meth)acrylate monomer having a phenyl group and having a molecular weight of 200 or more. Examples include compounds represented by the following formula:

wherein each of X and Y independently represents H or $CH_3$; n represents an integer of 2 to 10; Ph represents a phenyl group; R represents $C_mH_{2m+1}$; and m represents an integer of 0 to 12.

Specific examples include phenoxypolyethylene glycol acrylate, phenoxypolypropylene glycol acrylate, and nonylphenol ethylene oxide modified acryalte. Of these, preferred are the compounds wherein n is 2 to 4 and R is H. The above (meth)acrylate is commercially available and, for example, phenoxypolyethylene glycol acrylate is available as a trade name of LIGHT-ACRYLATE P200A {structural formula: $CH_2CHCOO(C_2H_4O)_2$—Ph; Mw: 236} and nonylphenol ethylene oxide modified acrylate is available as a trade name of NP-4EA {structural formula: $CH_2CHCOO(C_2H_4O)_4$—$PhC_4H_{19}$; Mw: 450} from KYOEISHA CHEMICAL Co., LTD. These monomers produce very little odor and produce very little fumes and odor during ultraviolet radiation, as compared to phenoxyethyl acrylate. Therefore, they remarkably improve the operability of the sealant composition. These (meth)acrylic acid esters may be used in combination.

With respect to the photoreaction initiator as component (b) or component (3), there is no particular limitation, and general-purpose initiators can be used. Examples include organic peroxides, benzoin compounds, acetophenone, benzophenone, thioxanthone, α-acyloxime ester, phenylglyoxylate, benzyl, azo compounds, diphenyldisulfide compounds, acylphosphine oxide compounds, organic dye compounds, and iron phthalocyanine compounds, and especially preferred are benzoin compounds, acetophenone, phenylglyoxylate, and acylphosphine oxide compounds. These may be used in combination.

The (meth)acrylic acid ester having an acid group as component (a)' is a component for improving the adhesion of the sealant composition to metals, and examples include (meth)acrylic acid esters containing a phosphoric acid group or a salt thereof, such as 2-(meth)acryloyloxyethyl phosphate, 2-(meth)acryloyloxypropyl phosphate, and salts thereof; (meth)acrylic acid esters containing a carboxyl group or a salt thereof, such as 2-(meth)acryloyloxyethyl phthalate, 2-(meth)acryloyloxyethyl succinate, 2-(meth)acryloyloxyethyl hexahydrophthalate, and salts thereof; and (meth)acrylic acid esters containing a sulfonic acid group or a salt thereof, such as 2-acrylamido-2-methylpropanesulfonic acid, 2-methacrylamido-2-methylsulfonic acid, 2-(meth)acrylamidoethanesulfonic acid, 2-(meth)acrylamidopropanesulfonic acid, and salts thereof. These (meth)acrylic acid esters are commercially available and, for example, 2-methacryloyloxyethyl phosphate is available from KYOEISHA CHEMICAL Co., LTD. as a trade name of LIGHT-ACRYLATE P-1M, and 2-acryloyloxyethyl phthalate is available from KYOEISHA CHEMICAL Co., LTD. as a trade name of LIGHT-ACRYLATE HOA-MPL.

As the thermoplastic resin for component (C), preferred are ones which can be dispersed or dissolved in the (meth)acrylate monomer as a main component and which improves the transparency of the whole system of the composition uncured. Specific examples include styrene block copolymers, such as styrene-isoprene-styrene block copolymers (SIS), styrene-butadiene-styrene block copolymers (SBS), styrene-ethylene-butylene-styrene block copolymers (SEBS), styrene-ethylene-propylene-styrene block copolymers (SEPS), and styrene-1,4-butadiene-butylene-styrene block copolymers (SBBS); polyurethane thermoplastic elastomers; polyester thermoplastic elastomers; polyamide thermoplastic elastomers; ethylene-vinyl acetate thermoplastic elastomers (EVA); ethylene-ethyl acrylate copolymers; and polystyrene. Of these, especially preferred are EVA, SBBS, and SBS. Examples of commercially available EVA include EVAFLEX 45X, 40Y, 150, and 210 (manufactured by Du Pont-Mitsui Polychemicals Co., Ltd.), examples of commercially available SBBS include Tuftec JT82P, JT83P, and JT84P (manufactured by Asahi Kasei Corporation), and examples of commercially available SBS include KRATON D-1101, D-KX155, D-1122X, and D-1184 (manufactured by Shell Chemicals Japan Ltd.). By using the thermoplastic resin, it is possible to prevent lifting which is likely to occur when the sealant cured is exposed to high temperatures, and to improve the toughness and hardness of the sealant cured.

With respect to the filler as component (d), there is no particular limitation, and examples include silica and hydrophobic silica. As the hydrophobic silica, specifically, silica fine powder having a hydrophobic surface with, e.g., an alkyl group can be used. This hydrophobic silica advantageously has features such that it has an affinity with oil and high oil absorption, and it thickens the composition into paste state and does not inhibit transmission of light. The hydrophobic silica preferably has a carbon content of 0.5 to 6% by weight, more preferably 1 to 4% by weight, and preferably has an average primary particle diameter of 100 nm or less, more preferably 40 nm or less. Examples of commercially available hydrophobic silica include Aerosil R972, R974, RX200, RY200, R202, R805, and R812S (manufactured by Nippon Aerosil Co., Ltd.).

With respect to the (meth)acrylate monomer having no phenyl group as component (a)", there is no particular limitation as long as it is (a)an (meth)acrylate monomer having no phenyl group in its molecule and having a glass transition temperature of −20° C. or lower as measured with respect to the homopolymer thereof, but preferred are those having 2 or less ethylene oxide chains and having a molecular weight of 200 or more. Specifically, for example, 2-ethylhexyl carbitol acrylate is available from Toagosei Co., Ltd. as a trade name of ARONIX M-120 {structural formula: $CH_2CHCO(OC_2H_4)_2OCH_2CH(C_2H_5)C_4H_9$; Mw: 272; Tg: −65° C.}.

With respect to the epoxy resin as component (e), there is no particular limitation, but, for preventing increase in viscosity of the resultant composition, preferred are liquid epoxy resins. Examples include EPIKOTE 828 (manufactured by Japan Epoxy Resins Co., Ltd.), and EPIKURE DICY 7 (manufactured by Japan Epoxy Resins Co., Ltd.).

With respect to the latent curing agent as component (f), there is no particular limitation, and examples include dicyandiamide.

Examples of (meth)acrylate monomers as component (1) having a phenyl group and having a solubility parameter (SP value) of 9 to 14 (preferably 10 to 13, more preferably 10 to 12) include phenoxyethyl acrylate, phenoxypolyethylene glycol acrylate, and phenoxypolypropylene glycol acrylate. These (meth)acrylate monomers may be used in combination. The SP value used in the present specification means an SP value as determined by the Fedors method.

The above (meth)acrylate monomers are commercially available and, for example, phenoxyethyl acrylate is available as a trade name of LIGHT-ACRYLATE PO-A (SP value: 10.1) and phenoxypolyethylene glycol acrylate is available as a trade name of LIGHT-ACRYLATE P-200A (SP value: 10.3) from KYOEISHA CHEMICAL Co., LTD.

Especially, phenoxypolyethylene glycol acrylate is preferably used since it produces less odor and produces relatively little fumes and odor during ultraviolet radiation and remarkably improves the operability of the sealant composition.

As the polystyrene or the copolymer containing styrene as a copolymer component for component (2), preferred are thermoplastic resins which can be dispersed or dissolved in the (meth)acrylate monomer for component (1) as a main component and which improves the transparency of the composition uncured. It is more preferred that the copolymer has a melt flow rate of 0 to 500 g/10 minutes (as measured in accordance with JIS K 7210 at 200° C. under a load of 10 kg) as a value for physical properties. Specific examples of copolymers containing styrene as a copolymer component include styrene-butadiene-styrene block copolymers, styrene-isoprene-styrene block copolymers, styrene-ethylene-butylene-styrene block copolymers, styrene-ethylene-propylene-styrene block copolymers, and styrene-1,4-butadiene-butylene-styrene block copolymers. It is more preferred that the copolymer has a styrene content of 5% by weight or more. These copolymers may be used in combination.

Next, the compositions of the present inventions (1) to (9) are described below. The present composition may contain other monomers as long as the adhesion of the composition to oil-coated surface is not sacrificed, and may contain a crosslinking agent for imparting heat resistance, such as a multifunctional monomer or oligomer; a plasticizer for imparting low-temperature flexibility, such as phthalic acid ester; a surfactant; an oil absorbing resin, an organic or inorganic pigment; a stabilizer; and a thermal reaction initiator, such as an organic peroxide, for advancing the curing reaction satisfactorily in a portion of the composition applied where light hardly reaches or in the composition applied with a larger thickness.

The present composition preferably comprises 100 parts by weight of the (meth)acrylate monomer having a phenyl group and having a molecular weight of 200 or more; 0 to 100 parts by weight (more preferably 0.1 to 10 parts by weight) of at least one (meth)acrylic acid ester containing at least one group selected from a phosphoric acid group, a sulfonic acid group, a carboxyl group, and salts thereof; 0 to 60 parts by weight (preferably 2 to 60 parts by weight, more preferably 4 to 40 parts by weight) of hydrophobic silica; 0 to 50 parts by weight (more preferably 5 to 50 parts by weight) of a thermoplastic resin; and 0.01 to 20 parts by weight (more preferably 0.1 to 10 parts by weight) of a photoreaction initiator. It is preferred that the sealant composition has a viscosity of 10,000 to 200,000 mPa·s. The viscosity is measured in accordance with JIS K-6830 (note: Test Method for Sealant for Automobile).

Next, the compositions of the present inventions (10) and (11) are described below. Optional components in the present composition are the same as those in the inventions (1) to (9). In addition, for lowering the curing temperature of the composition by heat, various curing accelerators may be added to the composition.

The present composition preferably comprises 100 parts by weight of the sum of component (a) and component (a)" {or 100 parts by weight of the sum of component (a), component (a)", and component (c)}, and 20 to 200 parts by weight of the sum of component (e) and component (f). Further, the composition may further comprise component (a)', and, in this case, the composition preferably comprises 100 parts by weight of the sum of component (a) and component (a)" {or 100 parts by weight of the sum of component (a), component (a)", and component (c)}, and 20 parts by weight or less (more preferably 0.1 to 10 parts by weight) of component (a)'.

Preferred composition comprises 100 parts by weight of two types of (meth)acrylic acid esters, 20 to 200 parts by weight (more preferably 40 to 100 parts by weight) of an epoxy resin and a latent curing agent, 2 to 60 parts by weight (more preferably 4 to 40 parts by weight) of hydrophobic silica, 0 to 200 parts by weight (more preferably 5 to 100 parts by weight) of a thermoplastic resin, and 0.01 to 20 parts by weight (more preferably 0.1 to 10 parts by weight) of a photoreaction initiator. It is preferred that the present composition has a viscosity of 10,000 to 200,000 mpa·s.

Next, the compositions of the present inventions (13) to (15) are described below. The present composition may contain a monomer having an SP value of less than 9 as long as the adhesion of the composition to oil-coated surface is not sacrificed, and may contain a crosslinking agent for imparting heat resistance, such as a multifunctional monomer or oligomer; a plasticizer for imparting low-temperature flexibility, such as phthalic acid ester; a surfactant; an oil absorbing resin, an organic or inorganic pigment; a stabilizer; and a thermal reaction initiator, such as an organic peroxide, for advancing the curing reaction satisfactorily in a portion of the composition applied where light hardly reaches or in the composition applied with a larger thickness. In the present composition, hydrophobic silica is not an essential component, but the composition can contain hydrophobic silica.

The present composition preferably comprises 100 parts by weight of component (1), 5 to 50 parts by weight (more preferably 10 to 50 parts by weight) of component (2), and 0.01 to 20 parts by weight (more preferably 0.1 to 10 parts by weight) of component (3). When the composition contains a (meth)acrylate monomer containing at least one group selected from a phosphoric acid group, a sulfonic acid group, a carboxyl group, and salts thereof, it is preferred that the amount of the (meth)acrylate monomer is 0.1 to 20 parts by weight (more preferably 0.1 to 10 parts by weight).

The viscosity of the composition as a sealant is preferably 10,000 to 200,000 mPa·s. Further, the viscosity of the composition as a coating agent is preferably 100 to 5,000 mPa·s.

Next, the method for preparing the compositions of the present inventions (1) to (15) is described below. The composition of the present invention can be prepared in accordance with the method conventionally known. Typically, the composition can be prepared by stirring and dissolving or dispersing the above-described ingredients by means of a high-speed agitator and defoaming the resultant mixture.

Next, the method for using the compositions of the present inventions (1) to (9) and (13) to (15) is described below. The present composition is applied to a base material and cured by light radiation using an appropriate light source in accordance with the use method for the sealant conventionally known. With respect to the light source, there is no particular limitation as long as it is an apparatus which generates light, such as UV light, electron beams, or infrared light, and examples include an ultrahigh-pressure mercury lamp, a xenon lamp, a mercury xenon lamp, a high-pressure mercury lamp, a metal halide lamp, an intermediate-pressure mercury lamp, a low-pressure mercury lamp, a chemical lamp, a germicidal lamp, a fluorescent lamp for Dorno rays, a black lamp, and excimer laser. These light sources may be used individually or in combination.

Finally, the method for using the compositions of the present inventions (10) to (12) is described below. The present composition is applied to a base material and cured by light radiation using an appropriate light source and further heating in accordance with the use method for the sealant conventionally known. With respect to the light source used in the present invention, there is no particular limitation as long as it is an apparatus which generates light, such as UV light, electron beams, or infrared light, and examples include an ultrahigh-pressure mercury lamp, a xenon lamp, a mercury xenon lamp, a high-pressure mercury lamp, a metal halide lamp, an intermediate-pressure mercury lamp, a low-pressure mercury lamp, a chemical lamp, a germicidal lamp, a fluorescent lamp for Dorno rays, a black lamp, and excimer laser. These light sources may be used individually or in combination. In the heating, a general heating oven can be used.

Hereinbelow, the present invention will be described with reference to the following Examples.

EXAMPLES 1 TO 4 AND COMPARATIVE EXAMPLES 1 AND 2

Compositions having the formulations shown below were individually stirred and dispersed by means of a high-speed agitator. Each of the resultant compositions was in a transparent or translucent paste state. The compositions were individually applied to various base materials so that the thickness became 2 mm, and irradiated with light from a high-pressure mercury lamp (270 mW/cm$^2$) for 5 seconds. As a result, each composition was cured in 5 seconds. Then, the composition cured was heated at 180° C. for 30 minutes. As can be seen in Table 1 below, the compositions exhibited excellent adhesion without suffering lifting after being heated. The compositions were individually strongly bonded to each base material (including oil-coated surface) and exhibited both excellent low-temperature flexibility and excellent water resistance. Especially the compositions in Examples 1 to 4 advantageously generated little fumes and little odor during UV radiation, as compared to the compositions in the Comparative Examples.

EXAMPLES 5 TO 7

The thickness of the cured product was at most 2 to 3 mm in Examples 1 to 4 (using solely Darocure 1173), whereas, when using an acylphosphine oxide compound (H) as a photoreaction initiator in combination with the initiator G, the thickness of the cured product was as large as 5 mm.

TABLE 2

| Formulation | | Example 5 | Example 6 | Example 7 |
|---|---|---|---|---|
| B | | 100 | 100 | 100 |
| C | | 0.5 | 2 | 1 |
| D | | 15 | | |
| E | | | 20 | 40 |
| F | | 15 | 15 | 10 |
| G (Photoreaction initiator) | | 1 | 2 | 3 |
| H (Photoreaction initiator) | | 0.5 | 0.1 | 0.05 |
| State before curing | Appearance | Translucent, paste | Translucent, paste | Translucent, paste |
| | Odor | Slight | Slight | Slight |

TABLE 1

| Formulation | | Example 1 | Example 2 | Example 3 | Example 4 | Comp. Ex. 1 | Comp. Ex. 2 |
|---|---|---|---|---|---|---|---|
| A (Acrylic acid ester monomer) | | | | | | 100 | 100 |
| B (Acrylic acid ester monomer) | | 100 | 100 | 100 | 100 | | |
| C (Acrylic acid ester monomer) | | 10 | 2 | 1 | 2 | 1 | 10 |
| D (Thermoplastic rein) | | 10 | | | | 10 | 20 |
| E (Thermoplastic rein) | | | 10 | 20 | 40 | | |
| F (Hydrophobic silica) | | 15 | 15 | 10 | 8 | 10 | 15 |
| G (Photoreaction initiator) | | 3 | 3 | 3 | 3 | 3 | 3 |
| State before curing | Appearance | Translucent, paste | Translucent, paste | Translucent, paste | Translucent, paste | Translucent, paste | Translucent, paste |
| | Odor | Slight | Slight | Slight | Slight | Strong | Strong |
| Photocurability | | ○ | ○ | ○ | ○ | ○ | ○ |
| Fumes produced during UV radiation | | Medium | Medium | Medium | Little | Much | Much |
| Odor produced during UV radiation | | Slight | Slight | Slight | Slight | Strong | Strong |
| Adhesion | Aluminum | ◎ | ◎ | ◎ | ◎ | ◎ | ◎ |
| | Galvanized steel sheet | ○ | ◎ | ◎ | ◎ | ○ | ◎ |
| | Zinc phosphate-treated steel sheet | ◎ | ◎ | ◎ | ◎ | ◎ | ◎ |
| | Electrodepostion coated sheet | ○ | ○ | ○ | ○ | ○ | ○ |
| | Aluminum* | ○ | ◎ | ◎ | ◎ | ◎ | ◎ |
| | Galvanized steel sheet* | ○ | ◎ | ◎ | ◎ | ◎ | ◎ |
| | Zinc phosphate-treated steel sheet* | ○ | ◎ | ◎ | ◎ | ◎ | ◎ |
| Hardness | | 40 | 35 | 40 | 65 | 45 | 55 |
| Heat resistance (180° C.) | | ◎ | ◎ | ◎ | ◎ | ◎ | ◎ |
| Low-temperature resistance (−30° C.) | | ◎ | ◎ | ◎ | ◎ | ◎ | ◎ |
| Low-temperature flexibility | | ○ | ○ | ○ | ○ | ○ | ○ |
| Water resistance (in boiling water for 1 hr) | | ◎ | ◎ | ◎ | ◎ | ◎ | ◎ |

Photocurability: ○ Excellent
Evaluation of adhesion (adhesion was evaluated with respect to 1 mm thickness): ◎ Cannot be peeled; ○ Strongly bonded (can be peeled); Δ Slightly weakly bonded; X Easily peeled.
Evaluation of heat resistance, low-temperature resistance, low-temperature flexibility, and water resistance: ◎ Excellent; ○ Substantially excellent; Δ Slightly bad; X Flow, fracture, and peeling.
*Press oil applied (2 to 3 μm)
A: Phenoxyethyl acrylate (LIGHT-ACRYLATE PO-A, manufactured by KYOEISHA CHEMICAL Co., LTD.)
B: Phenoxypolyethylene glycol acrylate (LIGHT-ACRYLATE P-200A, manufactured by KYOEISHA CHEMICAL Co., LTD.)
C: 2-Methacryloyloxyethyl phosphate (LIGHT-ESTER P-1M, manufactured by KYOEISHA CHEMICAL Co., LTD.)
D: EVA, EVAFLEX 40Y (manufactured by Du Pont-Mitsui Polychemicals Co., Ltd.)
E: SBBS, Tuftec JT82P (manufactured by Asahi Kasei Corporation)
F: Aerosil R972 (manufactured by Nippon Aerosil Co., Ltd.)
G: Darocure 1173 (manufactured by MERCK & CO., INC.; 2-hydroxy-2-methyl-1-phenyl-propane-1-one)

TABLE 2-continued

| Formulation | | Example 5 | Example 6 | Example 7 |
|---|---|---|---|---|
| Photocurability | | ◎ | ◎ | ◎ |
| Thickness of cured product | | 5 mm | 5 mm | 5 mm |
| Fumes produced during UV radiation | | Medium | Medium | Little |
| Odor produced during UV radiation | | Slight | Slight | Slight |
| Adhesion | Aluminum | ◎ | ◎ | ◎ |
| | Galvanized steel sheet | ◎ | ◎ | ◎ |
| | Zinc phosphate-treated steel sheet | ◎ | ◎ | ◎ |
| | Electrodepostion coated sheet | ○ | ○ | ○ |
| | Aluminum* | ◎ | ◎ | ◎ |
| | Galvanized steel sheet* | ◎ | ◎ | ◎ |
| | Zinc phosphate-treated steel sheet* | ◎ | ◎ | ◎ |
| Hardness | | 50 | 45 | 65 |
| Heat resistance (180° C.) | | ◎ | ◎ | ◎ |
| Low-temperature resistance (−30° C.) | | ◎ | ◎ | ◎ |
| Low-temperature flexibility | | ○ | ○ | ○ |
| Water resistance (in boiling water for 1 hr) | | ◎ | ◎ | ◎ |

H: 2,4,6-Trimethylbenzoyldiphenylphosphine oxide (manufactured by Lamberti)

COMPARATIVE EXAMPLE 3

A vinyl chloride sealer was applied individually to various base materials so that the thickness became 2 mm, and cured by heating (at 120° C. for 20 minutes). As a result, the sealer was not bonded to almost all the materials other than the zinc phosphate-treated steel sheet and electrodeposition coated sheet, and it was not bonded to almost all the oil-coated surfaces. In addition, slight yellowing was recognized in the sealer heated to 180° C.

TABLE 3

| Adhesion | Aluminum | X |
|---|---|---|
| | Galvanized steel sheet | X |
| | Zinc phosphate-treated steel sheet | ○ |
| | Electrodepostion coated sheet | ○ |
| | Aluminum* | X |
| | Galvanized steel sheet* | X |
| | Zinc phosphate-treated steel sheet* | Δ |
| Fumes produced during curing | | Almost none |
| Odor produced during curing | | Slight |
| Heat resistance (180° C.) | | Δ (Slightly yellowed) |
| Low-temperature resistance (−30° C.) | | ○ |
| Water resistance (in boiling water for 1 hr) | | ○ |
| Low-temperature flexibility | | ◎ |

Evaluation of adhesion: ◎ Cannot be peeled; ○ Strongly bonded (can be peeled); Δ Slightly weakly bonded; X Easily peeled.
Evaluation of heat resistance, low-temperature resistance, water resistance, and low-temperature flexibility: ◎ Excellent; ○ Substantially excellent; Δ Slightly bad; X Flow, fracture, and peeling.
*Press oil applied (2 to 3 μm)

EXAMPLES 8 TO 11

Compositions having the formulations shown below were individually stirred and dispersed by means of a high-speed agitator. Each of the resultant compositions was in a transparent or translucent paste state. The compositions were individually applied to various base materials so that the thickness became 2 mm, and irradiated with light from a high-pressure mercury lamp (270 mW/cm$^2$) for 5 seconds. As a result, each composition was cured in 5 seconds. Then, the composition cured was heated at 180° C. for 30 minutes. As can be seen in Table 4 below, the compositions exhibited excellent adhesion without suffering lifting after being heated. The compositions were individually strongly bonded to each base material (including oil-coated surface). In addition, no bubbles generated between the aluminum sheet and the cured sealant during the electrodeposition coating step, and finish after the electrodeposition coating was excellent.

TABLE 4

| Formulation | | Example 8 | Example 9 | Example 10 | Example 11 |
|---|---|---|---|---|---|
| A' (Acrylic acid ester monomer) | | 50 | 70 | 30 | 60 |
| B' (Acrylic acid ester monomer) | | 50 | 30 | 70 | 40 |
| C' (Acrylic acid ester monomer) | | 0 | 2 | 1 | 2 |
| D' Epoxy resin and curing agent | | 60 | 30 | 40 | 150 |
| E' (Thermoplastic rein) | | 20 | | | |
| F' (Thermoplastic rein) | | | 15 | 20 | 40 |
| G' (Hydrophobic silica) | | 20 | 30 | 10 | 8 |
| H' (Photoreaction initiator) | | 3 | 3 | 3 | 3 |
| State before curing | Appearance | Translucent, paste | Translucent, paste | Translucent, paste | Translucent, paste |
| Photocurability | | ○ | ○ | ○ | ○ |
| Fumes produced during UV radiation | | Medium | Medium | Medium | Little |
| Odor produced during UV radiation | | Slight | Slight | Slight | Slight |
| Adhesion | Aluminum | ◎ | ◎ | ◎ | ◎ |
| | Galvanized steel sheet | ○ | ◎ | ◎ | ◎ |
| | Zinc phosphate-treated steel sheet | ◎ | ◎ | ◎ | ◎ |
| | Electrodepostion coated sheet | ○ | ○ | ○ | ○ |
| | Aluminum* | ○ | ◎ | ◎ | ◎ |
| | Galvanized steel sheet* | ○ | ◎ | ◎ | ◎ |
| | Zinc phosphate-treated steel sheet* | ○ | ◎ | ◎ | ◎ |
| Hardness | | 40 | 35 | 40 | 65 |
| Heat resistance (180° C.) | | ◎ | ◎ | ◎ | ◎ |
| Low-temperature resistance (−30° C.) | | ◎ | ◎ | ◎ | ◎ |
| Low-temperature flexibility | | ○ | ○ | ○ | ○ |

TABLE 4-continued

| Formulation | Example 8 | Example 9 | Example 10 | Example 11 |
|---|---|---|---|---|
| Water resistance (in boiling water for 1 hr) | ◎ | ◎ | ◎ | ◎ |
| Bubbles in electrodeposition coating step (aluminum sheet) | None | None | None | None |

Evaluation of adhesion (adhesion was evaluated with respect to 1 mm thickness): ◎ Cannot be peeled; ○ Strongly bonded (can be peeled); Δ Slightly weakly bonded; X Easily peeled. Salt spray: After spraying a 5% aqueous salt solution, the sample was allowed to stand at 35 °C. for 500 hours and then evaluated.
Evaluation of heat resistance, low-temperature resistance, and water resistance: ◎ Excellent; ○ Substantially excellent; Δ Slightly bad; × Flow, fracture, and peeling.
Low-temperature flexibility: A sample was bent along a 50 mm Φ cylinder at −25° C.. A sample suffering neither crack nor peeling was rated ◎, and a sample suffering slight crack but no peeling was rated ○.
*Press oil applied (2 to 3 μm)
Electrodeposition conditions: At a voltage of 240 V for 10 min.
A': Phenoxypolyethylene glycol acrylate (LIGHT-ACRYLATE P-200A, manufactured by KYOEISHA CHEMICAL Co., LTD.)
B': 2-Ethylhexyl carbitol acrylate (ARONIX M-120, manufactured by Toagosei Co., Ltd.)
C': 2-Methacryloyloxyethyl phosphate (LIGHT-ACRYLATE P-1M, manufactured by KYOEISHA CHEMICAL Co., LTD.)
D': EPIKOTE 828 (manufactured by Japan Epoxy Resins Co., Ltd.), EPIKURE DICY 7 (manufactured by Japan Epoxy Resins Co., Ltd.); 5 Parts by weight of EPIKURE DICY 7, relative to 100 parts by weight of EPIKOTE 828.
E': EVA, EVAFLEX EVA 40Y (manufactured by Du Pont-Mitsui Polychemicals Co., Ltd.)
F': SBBS, Tuftec JT82P (manufactured by Asahi Kasei Corporation)
G': Aerosil R972 (manufactured by Nippon Aerosil Co., Ltd.)
H': Darocure 1173 (manufactured by MERCK & CO., INC.; 2-hydroxy-2-methyl-1-phenyl-propane-1-one)

EXAMPLES 12 TO 17

Compositions having the formulations shown below were individually stirred and dispersed by means of a high-speed agitator. Each of the resultant compositions was in a transparent or translucent paste state. The compositions were individually applied to various base materials so that the thickness became 20 μm to 2 mm, and irradiated with light from a high-pressure mercury lamp (270 mW/cm$^2$) for 1 to 5 seconds. As a result, each composition was cured in 5 seconds. Then, the composition cured was heated at 180° C. for 30 minutes. As can be seen in Table 5 below, the compositions exhibited excellent adhesion without suffering lifting after being heated. In addition, the compositions were individually strongly bonded to each base material including oil-coated surface.

TABLE 5

| Formulation | | Example 12 | Example 13 | Example 14 | Example 15 | Example 16 | Example 17 |
|---|---|---|---|---|---|---|---|
| A" {Component (1)} | | | | | 100 | 80 | 100 |
| B" {Component (1)} | | 100 | 100 | 100 | | 20 | |
| C" {Other acrylate monomer} | | 2 | 1 | 2 | 1 | 2 | 10 |
| D" {Component (2)} | | 10 | 20 | 50 | 10 | 20 | 40 |
| E" {Component (2)} | | | | 10 | 20 | | 20 |
| F" {Component (3)} | | 2 | 1 | 2 | 2 | 1 | 1 |
| G" {Component (3)} | | 0.1 | 0.5 | 0.1 | 0.1 | 0.5 | 0.5 |
| State before curing | Appearance | Translucent, liquid | Translucent, highly viscous liquid | Translucent, paste | Translucent, liquid | Translucent, highly viscous liquid | Translucent, paste |
| | Odor | Slight | Slight | Slight | Strong | Strong | Strong |
| Photocurability | | ○ | ○ | ○ | ○ | ○ | ○ |
| During UV radiation | Fumes | Medium | Medium | Little | Much | Much | Much |
| | Odor | Slight | Slight | Slight | Strong | Strong | Strong |
| Adhesion | Aluminum | ◎ | ◎ | ◎ | ◎ | ◎ | ◎ |
| | Galvanized steel sheet | ◎ | ◎ | ◎ | ○ | ○ | ◎ |
| | Zinc phosphate-treated steel sheet | ◎ | ◎ | ◎ | ◎ | ◎ | ◎ |
| | Electrodepostion coated sheet | ○ | ○ | ○ | ○ | ○ | ○ |
| | Aluminum* | ◎ | ◎ | ◎ | ◎ | ◎ | ◎ |
| | Galvanized steel sheet* | ◎ | ◎ | ◎ | ◎ | ◎ | ◎ |
| | Zinc phosphate-treated steel sheet* | ◎ | ◎ | ◎ | ◎ | ◎ | ◎ |
| Hardness | | 40 | 60 | 75 | 70 | 70 | 80 |
| Heat resistance (180° C.) | | ◎ | ◎ | ◎ | ◎ | ◎ | ◎ |
| Low-temperature resistance (−30° C.) | | ◎ | ◎ | ◎ | ◎ | ◎ | ◎ |

TABLE 5-continued

| Formulation | Example 12 | Example 13 | Example 14 | Example 15 | Example 16 | Example 17 |
|---|---|---|---|---|---|---|
| Low-temperature flexibility | ○ | ○ | ○ | ○ | ○ | ○ |
| Water resistance (in boiling water for 1 hr) | ◎ | ◎ | ◎ | ◎ | ◎ | ◎ |

Photocurability: ○ Excellent
Evaluation of adhesion (adhesion was evaluated with respect to 2 mm thickness in Examples 2, 3, 5, and 6 and with respect to 50 μm thickness in other Examples): ◎ Cannot be peeled; ○ Strongly bonded (can be peeled); Δ Slightly weakly bonded; X Easily peeled.
Evaluation of heat resistance, low-temperature resistance, and water resistance: ◎ Excellent; ○ Substantially excellent; Δ Slightly bad; X Flow, fracture, and peeling.
*Press oil applied (2 to 3 μm)
A": Phenoxyethyl acrylate (LIGHT-ACRYLATE PO-A, manufactured by KYOEISHA CHEMICAL Co., LTD.)
B": Phenoxypolyethylene glycol acrylate (LIGHT-ACRYLATE P-200A, manufactured by KYOEISHA CHEMICAL Co., LTD.)
C": 2-Methacryloyloxyethyl phosphate (LIGHT-ACRYLATE P-1M, manufactured by KYOEISHA CHEMICAL Co., LTD.)
D": Styrene-butadiene-styrene block copolymer (Tufprene A, manufactured by Asahi Kasei Corporation)
E": Styrene-isoprene-styrene block copolymer (Califlex TR 1101, manufactured by Shell Chemicals Japan Ltd.)
F": 2-Hydroxy-2-methyl-1-phenyl-propane-1-one (Darocure 1173, manufactured by MERCK & CO., INC.)
G": 2,4, 6-Trimethylbenzoyldiphenylphosphine oxide (manufactured by Lamberti)

EFFECT OF THE INVENTION

The energy curable sealant compositions of the present inventions (1) to (10) are in a paste state at room temperature similar to that of a vinyl chloride sealer, and hence they can be readily applied similarly by means of a sealer gun. In addition, the compositions can be readily cured by light in a short time without heating, thus making it possible to considerably reduce the cost for energy and the operation time. Further, the compositions have excellent adhesion to galvanized steel sheet or aluminum sheet coated with press oil or anticorrosive oil and hence have an advantage in that the composition is not washed away in the cleaning step for oil before the coating step. The compositions generate less odor during production and application of the products and have excellent low-temperature flexibility after being cured. Further, the compositions do not contain any halogen, such as chlorine, and therefore they can be disposed of by burning without any problem, causing no environmental pollution.

Further, the energy curable sealant compositions of the present inventions (11) and (12) appear to be in a paste state at room temperature similar to that of a vinyl chloride sealer, and hence they can be readily applied similarly by means of a sealer gun. In addition, by employing a heating step, there can be obtained effects to improve the adhesion of the sealant composition to various materials coated with oil, improve the hardness and low-temperature flexural properties of the composition cured, and suppress generation of bubbles between the sealant and a base material after electrodeposition coating. Further, the compositions have excellent adhesion to galvanized steel sheet or aluminum sheet coated with press oil or anticorrosive oil and hence have an advantage in that the composition is not washed away in the cleaning step for oil before the coating step. Further, the compositions do not contain any halogen, such as chlorine, and therefore they can be disposed of by burning without any problem, causing no environmental pollution.

The energy curable compositions of the present inventions (13) to (15) can change the forms of their products from liquid state to paste state depending the formulations of the compositions, and the compositions have adhesion to oil-coated surface and therefore they have wide application of from a coating agent to a sealant. In addition, the compositions can be readily cured by light in a short time without heating, thus making it possible to considerably reduce the cost for energy and the operation time. Further, the compositions have excellent adhesion to galvanized steel sheet or aluminum sheet coated with press oil or anticorrosive oil and hence have an advantage in that the composition is not washed away in the cleaning step for oil before the coating step. Further, the compositions do not contain any halogen, such as chlorine, and therefore they can be disposed of by burning without any problem, causing no environmental pollution.

What is claimed is:

1. A method of applying a cured sealant to an oil-coated material, comprising
   (i) applying an energy curable sealant composition to said oil-coated material, said energy curable sealant composition comprising:
      (a) a (meth)acrylate monomer having a phenyl group and having a molecular weight of 200 or more and
      (b) a photoreaction initiator, and
   (ii) curing said energy sealant composition.

2. The method according to claim 1, wherein said (meth) acrylate monomer (a) is a compound represented by the following formula:

$CH_2CXCOO[CH_2CH(Y)O]_n-PhR$ wherein each of X and Y independently represents H or $CH_3$; n represents an integer of 2 to 10; Ph represents a phenyl group; R represents $C_mH_{2m+1}$; and m represents an integer of 0 to 12.

3. The method according to claim 2, wherein the energy curable sealant composition further comprises (c) a thermoplastic resin selected from the group consisting of an ethylene-vinyl acetate copolymer, an ethylene-ethyl acrylate copolymer, a styrene-butadiene-styrene block copolymer, a styrene-ethylene-butylene-styrene block copolymer, a styrene-ethylene-propylene-styrene block copolymer and a styrene-1,4-butadiene-butylene-styrene block copolymer.

4. The method according to claim 3, wherein said photoreaction initiator (b) is an acetophenone or an acylphosphine oxide compound.

5. The method according to claim 4, wherein the energy curable sealant composition further comprises (d) a filler which is silica or hydrophobic silica.

6. The method according to claim 1, wherein the energy curable sealant composition further comprises: (a1) a (meth) acrylate monomer not having a phenyl group and having a glass transition temperature of −20° C. or lower as measured with respect to the homopolymer thereof; (e) an epoxy resin; and (f) a latent curing agent.

7. The method according to claim 2, wherein the energy curable sealant composition further comprises: (a1) a (meth) acrylate monomer not having a phenyl group and having a glass transition temperature of −20° C. or lower as measured with respect to the homopolymer thereof; (e) an epoxy resin; and (f) a latent curing agent.

8. The method according to claim 3, wherein the energy curable sealant composition further comprises: (a1) a (meth) acrylate monomer not having a phenyl group and having a glass transition temperature of −20° C. or lower as measured with respect to the homopolymer thereof; (e) an epoxy resin; and (f) a latent curing agent.

9. The method according to claim 4, wherein the energy curable sealant composition further comprises: (a1) a (meth) acrylate monomer not having a phenyl group and having a glass transition temperature of −20° C. or lower as measured with respect to the homopolymer thereof; (e) an epoxy resin; and (f) a latent curing agent.

10. The method according to claim 5, wherein the energy curable sealant composition further comprises: (al) a (meth) acrylate monomer not having a phenyl group and having a glass transition temperature of −20° C. or lower as measured with respect to the homopolymer thereof; (e) an epoxy resin; and (f) a latent curing agent.

11. The method according to claim 6, wherein the energy curable sealant composition contains 100 parts by weight of the sum of said component (a) and said component (a1), and 20 to 200 parts by weight of the sum of said epoxy resin (e) and said latent curing agent (f).

12. The method according to claim 7, wherein the energy curable sealant composition contains 100 parts by weight of the sum of said component (a) and said component (a1), and 20 to 200 parts by weight of the sum of said epoxy resin (e) and said latent curing agent (f).

13. The method according to claim 8, wherein the energy curable sealant composition contains 100 parts by weight of the sum of said component (a) and said component (a1), and 20 to 200 parts by weight of the sum of said epoxy resin (e) and said latent curing agent (f).

14. The method according to claim 9, wherein the energy curable sealant composition contains 100 parts by weight of the sum of said component (a) and said component (a1), and 20 to 200 parts by weight of the sum of said epoxy resin (e) and said latent curing agent (f).

15. The method according to claim 10, wherein the energy curable sealant composition contains 100 parts by weight of the sum of said component (a) and said component (a1), and 20 to 200 parts by weight of the sum of said epoxy resin (e) and said latent curing agent (f).

16. The method according to claim 6, wherein the energy curable sealant composition contains 100 parts by weight of the sum of said component (a), said component (a1) and said thermoplastic resin (c); and 20 to 200 parts by weight of the sum of said epoxy resin (e) and said latent curing agent (f).

17. The method according to claim 7, wherein the energy curable sealant composition contains 100 parts by weight of the sum of said component (a), said component (a1) and said thermoplastic resin (c); and 20 to 200 parts by weight of the sum of said epoxy resin (e) and said latent curing agent (f).

18. The method according to claim 8, wherein the energy curable sealant composition contains 100 parts by weight of the sum of said component (a), said component (a1) and said thermoplastic resin (c); and 20 to 200 parts by weight of the sum of said epoxy resin (e) and said latent curing agent (f).

19. The method according to claim 9, wherein the energy curable sealant composition contains 100 parts by weight of the sum of said component (a), said component (a1) and said thermoplastic resin (c); and 20 to 200 parts by weight of the sum of said epoxy resin (e) and said latent curing agent (f).

20. The method according to claim 10, wherein the energy curable sealant composition contains 100 parts by weight of the sum of said component (a), said component (a1) and said thermoplastic resin (c); and 20 to 200 parts by weight of the sum of said epoxy resin (e) and said latent curing agent (f).

21. A method of applying a cured sealant to an oil-coated material, comprising (i) applying an energy curable sealant composition to said oil-coated material, said energy curable sealant composition comprising:

(a) 100 parts by weight of a (meth)acrylate monomer containing a phenyl group and having a molecular weight of 200 or more;

(b) 0 to 100 parts by weight of a (meth)acrylate acid ester selected from the group consisting of a (meth)acrylic acid ester containing a phosphoric acid group or a salt thereof; a (meth)acrylic acid ester containing a sulfonic acid group or a salt thereof; and a (meth)acrylic acid ester containing a carboxyl group or a salt thereof;

(c) 2 to 60 parts by weight of hydrophobic silica;

(d) 0 to 50 parts by weight of a thermoplastic resin; and (e) 0.01 to 20 parts by weight of a photoreaction initiator, and (ii) curing said energy sealant composition.

* * * * *